United States Patent [19]

Sachs

[11] 4,239,797
[45] Dec. 16, 1980

[54] NON-SKID FLOOR TILE

[75] Inventor: Peter R. Sachs, New Windsor, N.Y.

[73] Assignee: GAF Corporation, New York, N.Y.

[21] Appl. No.: 946,943

[22] Filed: Sep. 29, 1978

[51] Int. Cl.³ .................. B32B 5/16; B32B 19/04
[52] U.S. Cl. ........................... 428/327; 428/47;
428/48; 428/147; 428/161; 428/172; 428/340;
428/443; 428/520; 428/522; 427/180; 427/186;
427/198
[58] Field of Search .............. 428/327, 340, 443, 147,
428/161, 172, 47, 48, 425, 522, 520, 412, 483;
427/180, 186, 198

[56] References Cited

U.S. PATENT DOCUMENTS

| 2,793,136 | 5/1957 | Root ........................ 428/327 |
| 3,078,510 | 2/1963 | Rowe ........................ 428/327 |
| 3,666,521 | 5/1972 | Weyna ........................ 428/451 |
| 3,679,539 | 7/1972 | Gossens ........................ 428/149 |
| 3,924,023 | 12/1975 | Boranian ........................ 428/334 |
| 3,991,006 | 11/1976 | Chandler ........................ 260/42.43 |

FOREIGN PATENT DOCUMENTS 1006294  9/1965  United Kingdom .

*Primary Examiner*—Ellis P. Robinson
*Attorney, Agent, or Firm*—Walter C. Kehm; Joshua J. Ward

[57] ABSTRACT

Non-skid vinyl floor tile having embedded in the surface thereof between about 1 and about 5 grams per square foot of thermoplastic material in the size range between about 1/32 and about 3/32 inch. The particulate material has a hardness of not more than Rockwell M-100 and a Taber abrasion weight loss of not more than about 75 mg per 1000 cycles using CS-17 wheels and 1000 gram weights.

12 Claims, No Drawings

NON-SKID FLOOR TILE

BACKGROUND OF THE INVENTION

In the manufacture of vinyl floor tiles, it is sometimes desirable to provide such material with a non-skid surface. Conventional non-skid tile is made by heating individual pieces or ordinary vinyl tile, sprinkling the surface with carborundum grit and then embedding the grit into the surface of the tile with a hand operated platen press. This process is slow and tends to distort the tile. Further, it is difficult to embed the carborundum particles properly since only mechanical adhesion is present. Non-skid floor tiles have also been made in a continuous operation for short periods of time by throwing carborundum particles onto a sheet of tile base just before final calendering of the sheet so that the particles become embedded in the sheet during the final calendering of the sheet. This can not be done on a routine production line basis, however, because the hard abrasive grit destroys the surface of the planishing roll used to press the particles into the sheet of tile material and the accuracy of the cutting dies used to cut individual tiles from the sheet of tile material. Sheet vinyl flooring having particulate matter protruding from the surface thereof has been manufactured, but the particles used have been so soft that they have not been effective in providing a non-skid surface.

SUMMARY OF THE INVENTION

Non-skid vinyl floor tile is provided which comprises vinyl tile having embedded in the surface thereof between about 1 and about 5 grams per square foot of tile surface (g/ft$^2$) of particulate thermoplastic material in the size range between about 1/32 inch and about 3/32 inch with such particulate material having a hardness of not more than about Rockwell M-100 and a Taber abrasion weight loss of not more than about 75 mg per 1000 cycles using CS-17 wheels and 1000 gram weights.

The process of the invention first forming vinyl tile base and then distributing on the tile base between about 1 and about 5 g/ft$^2$ of tile base surface of particulate thermoplastic material in the size range between about 1/32 and about 3/32 inch. The particulate material must have a hardness of not more than about Rockwell M-100 and a Taber abrasion weight loss of not more than about 75 mg per 1000 cycles using CS-17 wheels and 1000 gram weights. The particulate material is then planished into the surface of the tile.

DETAILED DESCRIPTION OF THE INVENTION

As mentioned above, the product of the invention is non-skid vinyl floor tile having particulate material of the type described above embedded in the surface of the tile. Tile base suitable for use in tiles of the invention includes conventional vinyl tile bases which may include for instance vinyl chloride polymer, filler and plasticizer. Such tile base may include other conventional ingredients such as pigment, light and heat stabilizers, etc. Vinyl tile base as described in U.S. Pat. Nos. 3,991,006 or 3,924,023, the disclosures of which are incorporated herein by reference, is for instance suitable for use in products of the invention.

As mentioned above, tile of the invention has embedded in the surface thereof between about 1 and about 5 g/ft$^2$ of particulate thermoplastic material in the size range between about 1/32 and about 3/32 inch with such material having a hardness of not more than about Rockwell M-100 and a Taber abrasion weight loss of not more than about 75 mg per 1000 cycles using CS-17 wheels and 1000 gram weights. The use of such amounts of material meeting the above-mentioned hardness and abrasion requirements is essential to obtaining a good non-skid wear layer on the products of the invention. Particles of greater hardness create problems in excessive wear of the dies used to cut individual tiles during manufacture while particulate material which abrades too easily will not provide satisfactory service for a non-skid floor surface. As mentioned, material having a Taber abrasion weight loss of not more than about 75 mg is required; however, material having a Taber abrasion weight loss not exceeding about 50 mg is preferred. With regard to size of the particles of particulate material embedded in the surface of the tile, sizes less than 1/32 inch will not generally provide sufficient resistance to skidding while material in excess of about 3/32 inch particle size tends to be so large as to break loose easily from the tile and to provide an unduly rough surface for most applications.

Tile of the invention may be of conventional thickness such as between about 1/16 and about 3/16 inch thick. The tile base may be made of homogeneous material throughout, with coloring in a conventional manner if desired. The tile base may also include decorative chips such as mottle or solid color chips either calendered into the surface of the tile base or present throughout the tile base, all in a conventional manner.

It will be understood that a wide variety of various types of materials are satisfactory for use as particulate thermoplastic material for embedding in products of the invention, providing the size, hardness and abrasion characteristics described above are met. Suitable materials include for instance polystyrene, various acrylics, e.g. polymethymethacrylate, polycarbonates, styrene-acrylonitrile copolymers, polybutylene terephthalate, etc. Though not essential, it is highly preferred that the plastics material used be capable of being recycled during manufacture of the tiles. This will allow scrap material such as rejected tile, material left as scrap by the cutting process, etc. to be reworked and become an integral part of the tile base for new tile rather than being wasted. Suitable materials can be colored or opaque as desired for decorative effect or may be essentially clear so that non-skid tile using particles of such material will not appear obviously different from ordinary tile made from the same tile base. The plastic material used is also preferably in the form of particles having irregularly shaped surfaces with relatively sharp edges so as to enhance the non-skid effect. Such particles may be made, for instance, by first forming a sheet of the desired material and then breaking the sheet into particles of the desired size range of between about 1/32 and about 3/32 inch.

In making tile by the process of the invention, the tile base may be formed in a conventional manner such as in the manner described in the above mentioned U.S. patents. Plastics particles to be embedded in the tile may be distributed onto the tile base by any conventional type of spreader. The particles may be spread onto the tile base while at any suitable temperature, usually about at room temperature or slightly above for convenience. The particles are preferably spread onto the tile base while the tile base is at an elevated temperature of about 150°–300° F., more usually between about 200° and about 250° F. Spreading the particles onto the tile base while the tile base is warm aids in subsequently embedding the particles in the tile base and results in improved adhesion of particles to tile base.

Thermoplastic particles distributed onto the tile base as described above may be pressed into the surface of the tile in any suitable manner such as by the use of an idler roller and conventional planisher (large diameter chrome drum with rubber back up roll). The idler roller serves to press the particles into the sheet of tile base and the planisher firmly embeds the particles in the tile. The amount of protrusion of the particles from the surface of the finished tile can be varied by varying the amount of pressure applied by the planisher in order to get various degrees of skid-proof characteristics. Protrusion of particles from the tile surface by between about 1/64 inch and about 1/32 inch is generally preferred. In accordance with a preferred embodiment of the invention, the thermoplastic particles are spread and planished while the tile base is at an elevated temperature of between about 150° and about 300° F. (more usually between 200° and about 250° F. Pressing of thermoplastic particles at such elevated temperatures results in greatly improved adhesion of particles to tile base due to fusion of the particles to the tile base.

It is one of the advantages of the present invention that non-skid tile can be produced in a continuous, "on line" process without excessive dulling of the dies used to cut individual tiles from the sheet of tile base having non-skid particles embedded therein. In practicing the process of the invention line speeds used are preferably in excess of 80 ft/min. usually between about 100 and about 175 ft/min.

The following example is intended to provide an illustrative embodiment of the invention without limiting the scope thereof.

EXAMPLE

A floor tile formulation was prepared from the following ingredients:

| Ingredient | Parts by Wt. |
| --- | --- |
| Vinyl chloride-vinyl acetate copolymer | 18 |
| Butyl benzyl phthalate | 9 |
| Dicyandiamide | 1 |
| Asbestos | 15 |
| 40 Mesh Limestone | 57 |

The above mixture was blended in a Baker-Perkins mixer and then milled and calendered to produce a sheet of tile base material 1/8 inch thick. The sheet of tile base was then coated with 3 g/ft² of 20 mesh polymethylmethacrylate particles (i.e. particles which would pass through a 20 mesh sieve). The particles were applied by a conventional spreader while the tile base sheet was traveling at a line speed of 125 ft/min and was at a temperature of 180° F. The particles were then pressed into the tile base at essentially the same travel rate and tile base temperature, after which the sheet was cut into individual tiles.

While the invention has been described above with respect to certain embodiments thereof, it will be appreciated that various changes and modifications may be made without departing from the spirit or scope of the invention.

What is claimed is:

1. Non-skid vinyl floor tile having embedded in the surface of the tile base thereof between about 1 and about 5 grams per sq. ft. of tile base surface of particulate thermoplastic material in the size range between about 1/32 inch and about 3/32 inch, said particulate material having a hardness of not more than about Rockewell M-100 and a Taber abrasion weight loss of not more than about 75 mg per 1000 cycles using CS-17 wheels and 1000 gram weights wherein said particulate material protrudes from the surface of the tile.

2. Floor tile according to claim 1 in which the tile base comprises filler, vinyl chloride polymer and plasticizer.

3. Floor tile according to claim 2 wherein the vinyl chloride polymer comprises vinyl chloride-vinyl acetate copolymer.

4. Floor tile according to claim 2 wherein the particulate thermoplastic material is selected from the group consisting of polystyrene, acrylics, polycarbonates, styrene-acrylonitrile copolymers, and polybutylene terephthalate.

5. Floor tile according to claim 4 which also contains decorative chips.

6. Floor tile according to claim 2 wherein the particulate material protrudes from the surface of the tile by between about 1/64 and 1/32 inch.

7. Process for making non-skid vinyl floor tile which comprises:
   a. First forming a vinyl tile base;
   b. then distributing on the tile base between about 1 and about 5 grams per sq. ft. of tile base surface of particulate thermoplastic material in the size range between about 1/32 and about 3/32 inch, said particulate material having a hardness of not more than about Rockwell M-100 and a Taber abrasion weight loss of not more than about 75 mg per 1000 cycles using CS-17 wheels and 1000 gram weights; and
   c. then pressing the particulate material into the surface of the tile so that said particulate material protrudes from the surface of the tile.

8. Method according to claim 7 wherein the tile base comprises a uniform mix of filler, vinyl polymer and plasticizer.

9. Method according to claim 6 wherein the particulate material, following step (c) protrudes from the surface of the tile by between about 1/64 and about 1/32 inch.

10. Method according to claim 7 wherein:
    a. The tile base is formed by continuously calendering a uniform mix comprising filler, vinyl chloride polymer, and plasticizer to form a continuous vinyl sheet having a thickness of from about 1/16 inch to about 1/8 inch, said continuous sheet being discharged from the calendering zone at a travel rate of at least about 80 ft. per minute; and
    b. the sheet is passed, following step (c) to a cutting zone wherein the sheet is cut to form individual non-skid tiles.

11. Floor tile according to claim 4 wherein the vinyl chloride polymer comprises vinyl chloride-vinyl acetate copolymer and the particulate material protrudes from the surface of the tile by between 1/64th and 1/32nd inch.

12. Method according to claim 10 wherein the particulate thermoplastic material is selected from the group consisting of polystyrene, acrylics, polycarbonates, styrene-acrylonitrile copolymers and polybutylene terephthalate, and wherein the particulate material protrudes from the surface of the finished tile by between about 1/64th and about 1/32nd inch.

* * * * *